No. 704,535. Patented July 15, 1902.
J. D. GRIFFEN.
TYPE WRITER.
(Application filed May 23, 1901.)
(No Model.) 5 Sheets—Sheet 1.

WITNESSES:
John Carolan

INVENTOR
John D. Griffen,
BY
W. B. Hutchinson,
ATTORNEY

No. 704,535. Patented July 15, 1902.
J. D. GRIFFEN.
TYPE WRITER.
(Application filed May 23, 1901.)
(No Model.) 5 Sheets—Sheet 2.
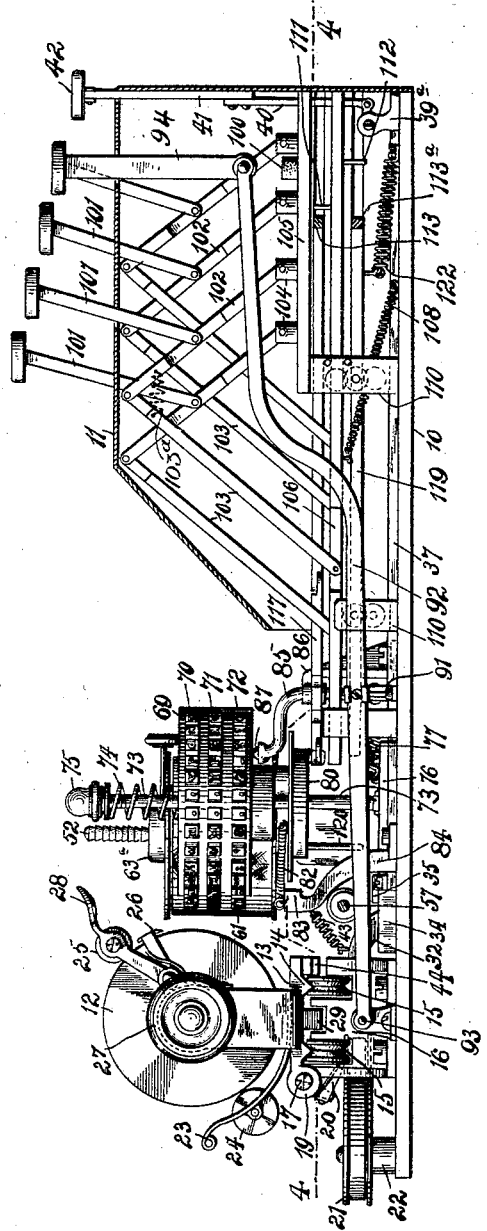
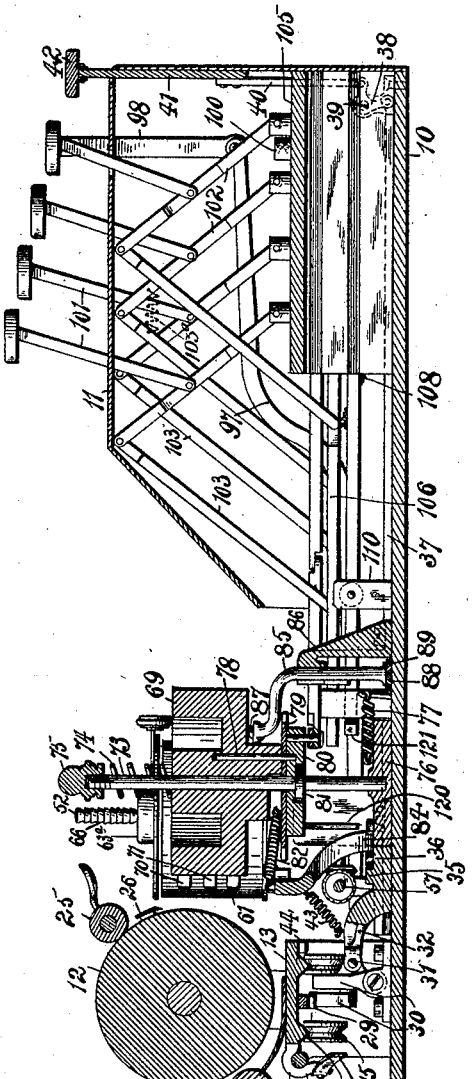
WITNESSES:
John Carolan
INVENTOR
John D. Griffen.
BY
W. D. Hutchinson,
ATTORNEY No. 704,535. Patented July 15, 1902.
J. D. GRIFFEN.
TYPE WRITER.
(Application filed May 23, 1901.)
(No Model.) 5 Sheets—Sheet 3.

WITNESSES:

INVENTOR
John D. Griffen.
BY
ATTORNEY

No. 704,535. Patented July 15, 1902.
J. D. GRIFFEN.
TYPE WRITER.
(Application filed May 23, 1901.)

(No Model.) 5 Sheets—Sheet 4.

WITNESSES:
John Carolan
Arthur L. Obrien

INVENTOR
John D. Griffen,
BY
W. B. Hutchinson
ATTORNEY

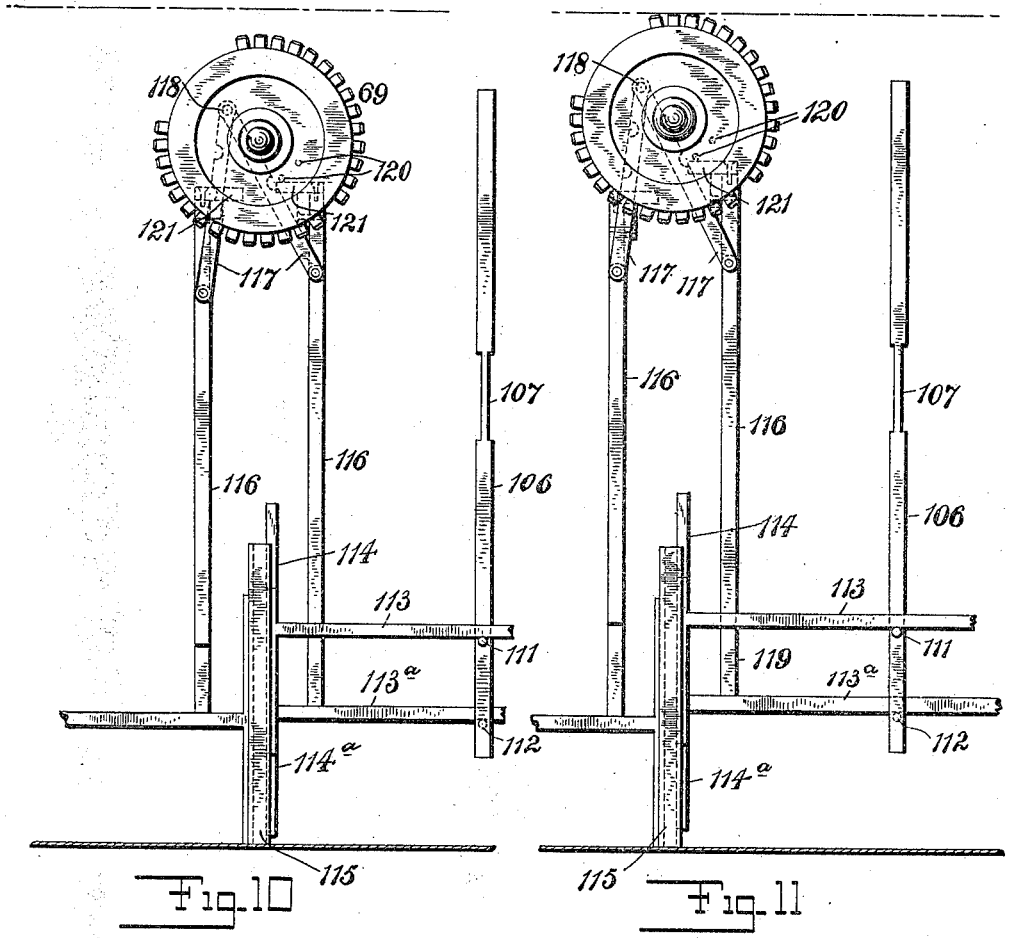

UNITED STATES PATENT OFFICE.

JOHN D. GRIFFEN, OF NEW YORK, N. Y.

TYPE-WRITER.

SPECIFICATION forming part of Letters Patent No. 704,535, dated July 15, 1902.

Application filed May 23, 1901. Serial No. 61,493. (No model.)

*To all whom it may concern:*

Be it known that I, JOHN D. GRIFFEN, of the city, county, and State of New York, have invented certain new and useful Improvements in Type-Writers, of which the following is a full, clear, and exact description.

My invention relates to improvements in type-writing machines, and especially to that class of type-writing machines in which a type-wheel is made to move back and forth in relation to a platen, so as to print on paper passed between itself and the platen.

The principal object of my invention is to produce a cheap, simple, and compact machine which will do the work of more expensive kinds, and, more in detail, to produce a machine having a very simple and powerful key mechanism arranged to actuate the type-wheel in such a manner as to print firmly and nicely upon the paper, to provide means for accurately locating and locking the type-wheel in its various positions, to produce a simple and efficient ribbon-feed by which the ribbon is moved first in one direction and then in the other to the end that it may be wholly utilized, and in general to produce a simple compact machine having its parts arranged so as to be conveniently and efficiently operated and so as to be easily kept in repair.

To these ends my invention consists of certain features of construction and combinations of parts, which will be hereinafter fully described and claimed.

Reference is to be had to the accompanying drawings, forming part of this specification, in which similar figures of reference refer to similar parts throughout the several views.

Figure 1:
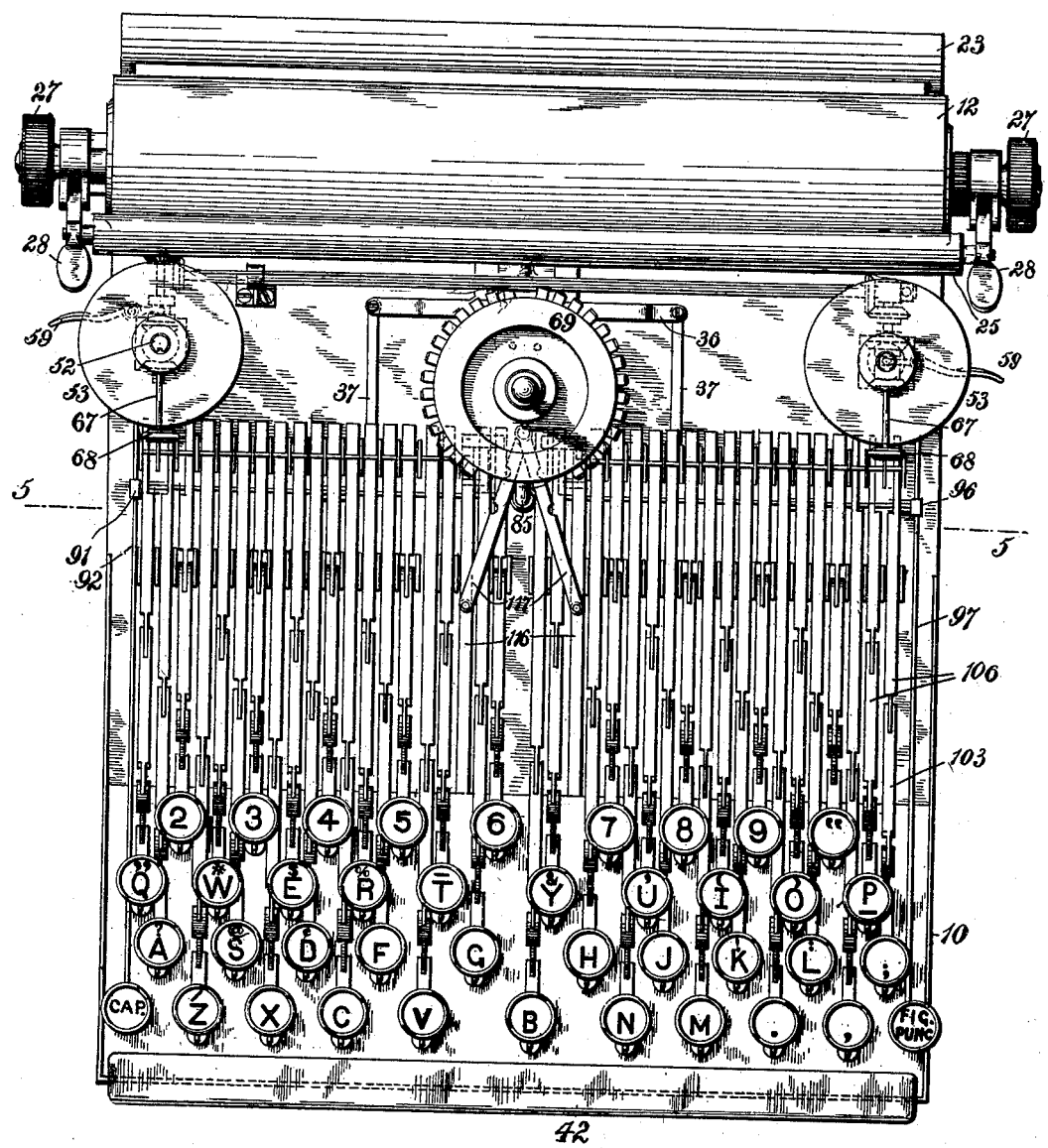
Figure 4:
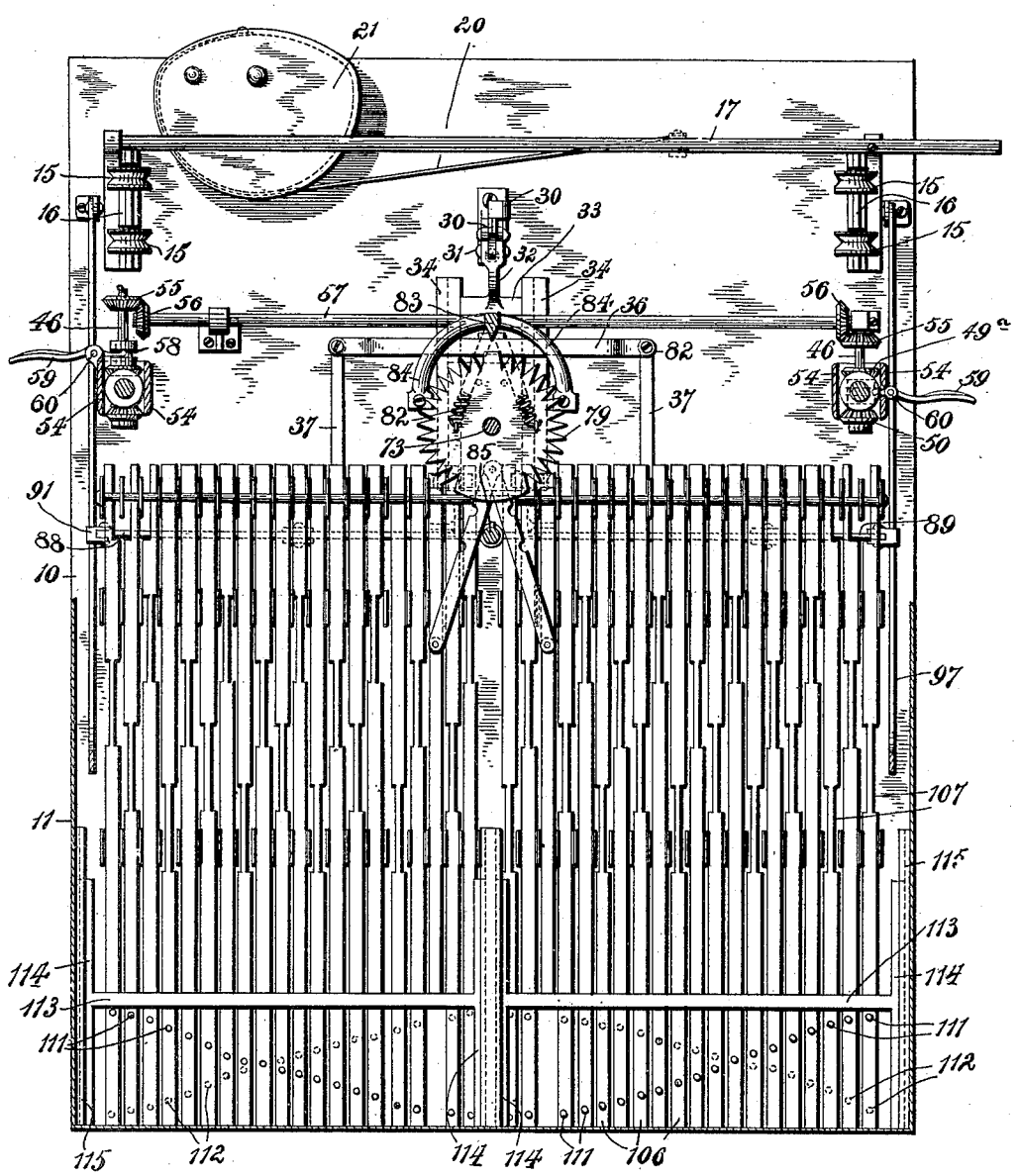
Figure 5:
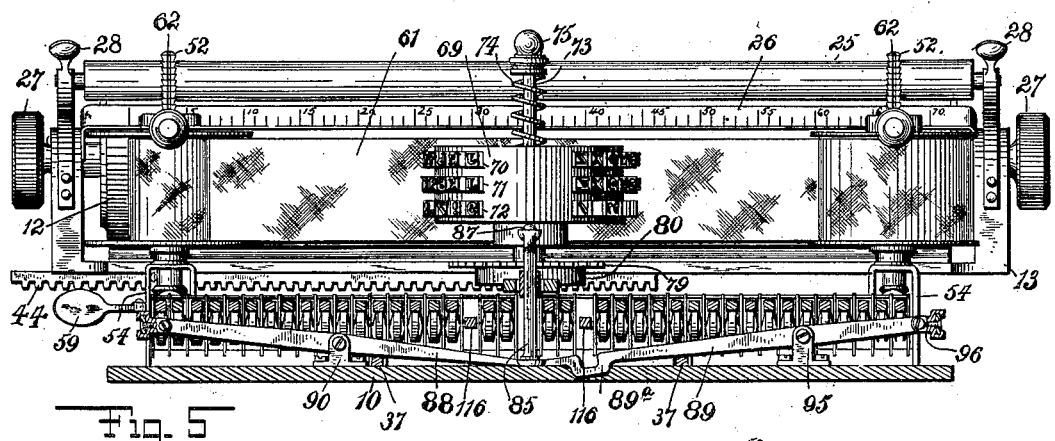
Figure 6:
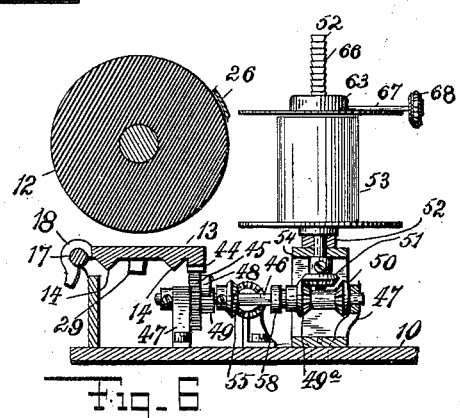
Figure 7:
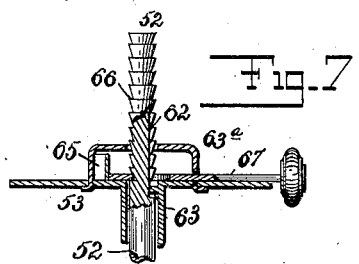
Figure 8:
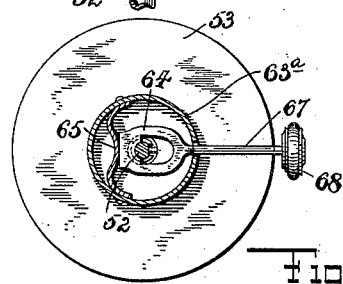
Figure 9:
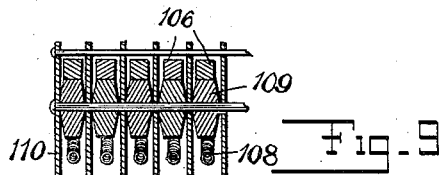
Figure 12:
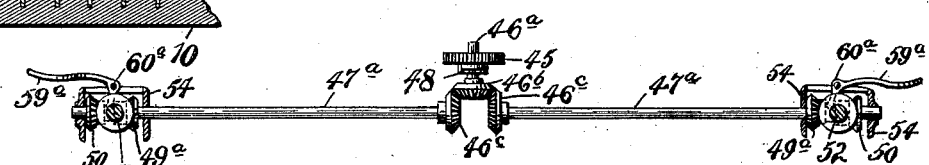

Figure 1 is a plan view of the machine embodying my invention, the housing over the keys being removed. Fig. 2 is a sectional elevation of the working parts of the machine. Fig. 3 is a central vertical longitudinal section of the machine. Fig. 4 is a sectional plan on the line 4 4 of Fig. 2. Fig. 5 is a cross-section on the line 5 5 of Fig. 1. Fig. 6 is a detail sectional view showing the arrangement of the ribbon-feed and its connection with the carriage. Fig. 7 is a detail sectional view of the connections between the ribbon-spool and its spindle. Fig. 8 is a sectional plan of the ribbon-spool and the means for holding the spool at the desired height. Fig. 9 is a cross-section through several of the keys, showing the means for supporting and returning them. Fig. 10 is a plan view of the type-wheel and its operating mechanism, showing the wheel turned to the desired position, ready to advance toward the platen. Fig. 11 is a view similar to Fig. 10, but with the type-wheel advanced against the platen, the broken line in Figs. 10 and 11 indicating the line of the platen; and Fig. 12 is a detail sectional plan of a preferred means of working the ribbon-feed.

In carrying out my invention it will be understood that any suitable framework can be employed for supporting the working mechanism; but I prefer to use a rectangular bed-plate 10, on the front part of which rises the housing 11 to cover the key mechanism and to guide the finger-rods, as will hereinafter appear. On the rear end of the bed-plate and arranged transversely is the customary rotary platen 12, which is mounted in the usual way upon a transversely-moving carriage 13, and this carriage and the mechanism it supports, together with the means for moving it, is substantially like many carriages in common use, so that I do not claim it, and neither do I limit my invention to the use of any particular style of carriage and connecting attachments, except that the particular connection between the carriage and the ribbon-feed I claim is novel.

As illustrated, the carriage has the V-shaped guides 14 on the under side, which run on grooved guide-rollers 15, these being mounted in suitable supports 16. The carriage slides, as usual, on a guide-rod 17, one ear 18 on the carriage being open, so the ear may slide by the support 16, and the other ear 19 (see Fig. 2) being closed, as usual. The carriage is normally moved to the left by a strap 20, connected to the carriage and to the ordinary spring-barrel 21, which is journaled on a suitable support 22 at the back of the carriage. On the carriage are supported also the usual paper-guide 23, the paper-rollers 24 and 25, the scale 26, the thumb-wheels 27 for turning the platen, and the usual levers 28 for turning the platen line by line.

All the foregoing mechanism is common and is not shown and described in great detail, the said mechanism being illustrated merely to show an operative construction in connection with the mechanism to be described below and which comprises the essential features of my invention. The means for releasing the carriage notch by notch is not, however, claimed except in its peculiar connections with the other parts. The carriage has the customary ratchet-rack 29, which is engaged by the ordinary form of double pawl 30, which is journaled in a suitable support and pivoted, as shown at 31, to the arm 32 of a slide-block 33, which moves back and forth in a slideway 34 on the bed-plate 10, and consequently the back-and-forth movement of the slide-block accomplishes the spacing, releasing the ratchet-rack 29 tooth by tooth, so that the spring-barrel may slide the carriage to the left. The carriage may be moved bodily in the opposite direction, as usual. Except for the peculiar arrangement of the slide-block 33 and the means for moving it the mechanism above described is not new.

The slide-block 33 has on the top a stud 35, which is engaged by a yoke 36, (see Figs. 3 and 4,) and the yoke 36 is at its ends fastened to the spacer-rods 37, which slide longitudinally on the bed of the machine (see Fig. 3) and are at their ends pivoted to bell-cranks 38, which are pivoted, as shown at 39, to supports 39ª, (see Figs. 2 and 3,) and the second arms of the bell-cranks connect by rods 40 and 41 with the finger-piece 42, which extends, as usual, across the front part of the machine, (see Fig. 1,) and thus it will be seen that by depressing the finger-piece 42 the bell-cranks 38 will be tilted, the rods 37 pushed back, and the yoke 36 caused to push against the stud 35, thus moving the slide-block 33 and operating the releasing-pawl 30. The rods 37 are moved against the tension of the spring 43, (see Fig. 3,) so that when the hand is raised from the finger-piece 42 the spacer-block 33 and rods 37 return.

The ribbon-feed is actuated from the carriage 13, and to this end the carriage has along its front edge and under side a rack 44, which engages a pinion 45. (See Figs. 5 and 6.) This pinion 45 is on one of the shafts 46, which, as shown in Fig. 4, are parallel with each other and are arranged longitudinally on the machine near opposite sides. Each shaft 46 is mounted in suitable supports 47, and one shaft has a fixed ratchet-wheel 49, which engages a pawl 48 on the pinion 45, above mentioned, which pinion is loose on the shaft, so that when the carriage moves step by step in its usual way the ratchet-wheel 49 will be turned by the pawl 45 and the shaft 46 turned; but when the carriage is pulled back to its first position the gear-wheel 45 turns loose on the shaft and the pawl 48 rides over the ratchet-wheel. Each shaft 46 is provided with oppositely-beveled pinions 49ª and 50, which are adapted to engage and drive the pinion 51 on the vertical spindle 52, which carries the ribbon-spool 53. Each spool is mounted in a suitable support 54. The shafts 46 are also provided with beveled pinions 55, which are engaged by pinions 56 on a connecting-shaft 57, (see Fig. 4,) which shaft is journaled in suitable supports on the bed-plate 10, and so the two shafts 46 are similarly moved. Each shaft 46 is also provided with a collar 58, which is a part of the sleeve carrying the pinions 49ª and 50, and the sleeve is made to slide on and turn with the shaft, as usual in such cases. The collar 58 is engaged by a finger-lever 59, which projects from the side of the machine, (see Fig. 4,) and by moving the lever the pinions 49ª and 50 may be moved and either pinion brought into engagement with the gear or pinion 51. If the pinions 49ª engage the pinions 51, the ribbon-spools 53 will be turned in one direction, and when the ribbon has been unwound from one spool and wound upon the other the finger-levers 59 are worked so as to cause the pinion 50 to engage the pinions or gear-wheel 51, and thus the motion of the ribbon-spools is reversed and the ribbon is rewound on the original spool. By reference to Fig. 4 it will be seen that the finger-levers are fulcrumed, as shown at 60, on the sides of the machine, so that the movement of the ribbon-spools can be easily reversed.

The feed above described for the ribbon necessitates rather a long rack 44, and for this reason the gear mechanism shown in Fig. 12 is better adapted for working the ribbon-feed from the carriage. Here the gear 45 is on a shaft 46ª, which is driven like the shaft 46, already described, and this shaft 46ª is centrally located and has a gear 46ᵇ, meshing with the beveled gears 46ᶜ on the inner ends of the shafts 47ª, which extend from the center toward the sides of the machine and which have the sliding gears 49ª and 50, like those already described. These are worked by a bell-crank lever 59ª, which is fulcrumed, as shown at 60ª, and by working the two levers 59ª the gears 49ª and 50 may be shifted so as to alternately engage the beveled pinion 51 on the spindle 52, and so drive the ribbon-feed in the desired direction.

The ribbon 61, which is carried by the ribbon-spools 53, may be of any usual kind, and by reference to Fig. 3 it will be seen that it moves between the type and the platen 12.

The spindle 52 of each ribbon-spool 53 is provided with a vertical keyway 62, which receives the key 63 (see Fig. 7) of the spool 53, and so the spool turns with the spindle, but can be lifted readily therefrom. The top of each spool is also provided with a housing 63ª, (see Figs. 7 and 8,) in which is arranged a sliding pawl 64, which straddles the spindle 52 and is pressed by a spring 65 into engagement with the teeth 66 on the spindle 52. The pawl has a handle 67, which extends outward through the housing 63ª and has a knob 68 at the end, which may be grasped to manipulate the pawl 64. It will be seen that by pushing in the pawl 64 against the tension of the spring 65 the pressure may be relieved and the spool 53 moved easily up and down, so that the ribbon may be adjusted at the desired height, preferably about an eighth of an inch at a step, this being about the height of the character on the type-wheel.

Immediately in front of the ribbon 61 and opposite the platen 12 is the type-wheel 69, which has on its surface horizontal rows of type 70, 71, and 72, representing lower case, upper case, and figures and punctuation-marks, respectively. This type-wheel revolves on and is movable vertically on the spindle or shaft 73, the type-wheel being normally pressed downward by a spring 74, which is coiled upon the shaft and is arranged between the type-wheel and a cap 75 at the top of the shaft. The type-wheel will drop to position by its own weight; but it is thought better to use a light spring to make the seating of the type-wheel surer.

The shaft 73 of the type-wheel is stepped in a slide-block 76, which moves in the slide-way 34, already referred to, and which abuts with the spacer-block 33, so that when the slide-block 76 is advanced to move the type-wheel 69 against the platen the spacer-block 33 is also moved and the spacing effected, as already described. Thus, it will be seen, a convenient means is provided for spacing without printing or for spacing as is necessary when printing is done. The slide-block 76 is normally retracted by a spring 77, which is secured to the slide-block and connected to the bed-plate 10 or some fixed support, as shown in Fig. 3. The type-wheel is also rigidly connected by a pin 78 or equivalent fastening with a star-wheel 79, which is thus held rigid on the under side of the wheel 69, and to a disk 80, which thus serves as the hub of the wheel, the disk turning on a flange 81 on the spindle or shaft 73. It is obvious that the parts 79 and 80 can be integral with the type-wheel, if preferred.

The type-wheel 69 is held centered or in a certain fixed position normally by springs 82, which are attached to the star-wheel 79 on opposite sides of its center and are also secured to the forked standard 84 or some equivalent fixture. This standard 84 is forked, so as to straddle the slide-blocks 33 and 76, and at the top is a tooth 83, which is adapted to engage the serrations of the star-wheel 79, and these serrations are made to come between the several type—that is, they have the right relation to the type—so that when the type-wheel is advanced to print the tooth 83 enters one of the serrations 79 of the type-wheel, and so guides the wheel and holds it rigid in order that the printing may be as accurate as possible.

The type-wheel 69, as above stated, is arranged to normally print lower-case characters; but in order that it may be raised to the desired height so as to print either upper-case characters or figures and punctuation-marks it rides on a substantially vertical arm 85, which moves up and down in a suitable bearing 86, (see Fig. 3,) and at the top there is a ball-and-cup connection between the arm and the type-wheel, though, of course, any suitable connection which will avoid too much friction may be substituted. This arm 85 rests on the inner ends of the levers 88 and 89, (see Fig. 5,) which are arranged laterally on the bed-plate and which are independent, so that when either is tilted the arm 85 and type-wheel 69 are raised.

The lever 88 is fulcrumed, as shown at 90, and its outer end is pivoted, as at 91, to the key-rod 92, (see Fig. 2,) and this key-rod is at one end pivoted, as shown at 93, to a suitable support on the bed-plate 10, and at the other end it is pivoted to a finger rod or key 94, which extends upward through the housing 11 and terminates in a suitable finger-piece marked to indicate upper-case characters. It will be seen that when the finger rod or key 94 is depressed the key-rod 92 is also depressed, thus depressing the outer end of the lever 88 and raising the inner end, so as to lift the type-wheel to the position to bring the upper-case characters opposite the platen. In order that a key may not be depressed too far, a bumper 100 is located beneath the finger rod or key 94.

The second lifting-lever 89 (see Fig. 5) has an offset, as shown at 89ª, to prevent it from striking one of the rods 116 for shifting the type-wheel, and this lever is fulcrumed, as shown at 95 in Fig. 5. It will be observed by reference to the figure just above mentioned that the levers 88 and 89 are similarly arranged; but the lever 89 is fulcrumed nearer its outer end, so that the inner end has more throw, and consequently when the lever 89 is operated the type-wheel will be raised higher, so as to bring the characters 72 in position to print. The outer end of the lever 89 is pivoted, as shown at 96, to a key-rod 97, which is arranged like the key-rod 92, already mentioned, and which likewise has a finger rod or key 98 at its forward end extending upward through the housing 11 and provided with a suitable finger-piece properly indicated, as shown in Fig. 1. It will be noticed, therefore, that while the type-wheel 69 is normally in position to print lower-case characters it can be shifted to the other two positions by simply pushing the appropriate key.

The machine has substantially the usual arrangement of keyboard, the finger-pieces being connected to the key-rods by finger rods or keys 101, which extend downward through the top of the housing 11 and which are severally pivoted to one of the toggle-levers 102, each lever 102 connecting pivotally with a second toggle-lever 103, and the toggle-levers 102 are at their lower ends pivoted to suitable supports 104 on the bracket 105, (see Fig. 2,) while the moving ends of the toggle-levers 103 are pivoted to the sliding finger-rods 106, which move backward and forward in the machine, being normally retracted by springs 108 and sliding over antifriction-rollers 109, which are journaled in suitable supports 110. If desired, the key-rods 106 may be retracted by connecting the toggle-levers 102 and 103 by springs 103ª, as shown by dotted lines in Figs. 2 and 3. Obviously the ends of the toggle-levers, which are held in fixed bearings, can be supported in any convenient way, and for convenience the key-rods 106 are reduced, as shown at 107, (see Figs. 10 and 11,) so that the toggle-levers 103 can straddle the key-rods and be easily pivoted to them.

In printing it will be observed that it is necessary to first turn the type-wheel 69 so as to bring the desired type opposite the platen, then lock the type-wheel in this position, and finally advance it against the platen. To this end each key-rod 106 has on the upper side a pin 111 and on the lower side a pin 112, adapted to respectively engage the forwardly-moving slide-bars 113 and 113ª, though in some cases the lower slide-bar 113ª is engaged before the upper slide-bar 113. This depends, as will hereinafter appear, on the character to be printed and on the distance which the type-wheel 69 must turn. There are two slide-bars 113, each extending half or substantially half across the machine and each being arranged on the same horizontal plane, this division being made so that friction will be reduced and the operations more easily performed. The slide-bars can be retracted by springs 122. Each slide-bar merges at the end in slide-bars 114, which move in slideways 115, arranged centrally on the bed 10 and at the sides of the bed, and it will be observed that the parts 113 and 114 constitute a light-weight slide, which has sufficient bearing in the slideways to prevent it from tilting and cramping, and which consequently can move forward easily when a type-key rod 106 engages it.

On each side of the machine, directly below the slide just described, is a similar slide made of the cross-bar 113ª and the slide-bars 114ª, which move in the same slideways 115 as the first-mentioned slides and which are arranged on a lower plane and are moved by the pins 112. The upper slides 113 114 when moved forward abut with the shifting rods 116, which move in suitable guides and preferably over antifriction-rollers and which are arranged on a plane just below the type-wheel, to which the rods are connected by the links 117, which are pivoted, as shown in Figs. 10 and 11 to the rods, and are also pivoted, as shown at 118, to the under side of the type-wheel. They are pivoted really to the part 80; but, as above explained, this constitutes a part of the type-wheel, as it is rigidly attached thereto. These links 117 are cut away in places, as shown clearly in Figs. 10 and 11, so that the wheel may have sufficient space to turn without bringing the pins 120, hereinafter referred to, into contact with the links 117. It will be seen that when one of the shifting rods 116 is moved toward the type-wheel the other rod 116 will also move and the type-wheel will be turned, and if the rod 116 at the right is first moved the point of attachment 118 to the type-wheel will turn to the left of the center of the wheel, and if the other rod 116 is first moved the point of contact 118 will turn to the right of the type-wheel. In this way sufficient throw is provided to turn the wheel any necessary distance. The rods 116 are moved by reason of their contact with the slides 113 114, and they are returned against the action of the slides by the springs 82, which center the type-wheel.

The slides 113ª 114ª have the same action as the slides above mentioned; but in their movement toward the type-wheel they abut with and engage with locking-rods 119, which are suitably guided and which have inturned ends 121, although these widened ends may be formed in any convenient way, which ends engage the pins 120, which are rigid on the type-wheel and extend downward from the under side thereof, as shown by dotted lines in Figs. 10 and 11 and by full lines in Figs. 2 and 3. The printing action, therefore, is as follows: When a finger rod or key 101 is depressed, the toggle-levers 102 and 103 are straightened out and a quick firm movement given to the key-rod 106. As the key-rod advances, the pin 111 thereof engages the slide-bar 113 and the slide moves forward, taking with it the shifting rods 116 and turning the type-wheel 69. As the above action takes place the pin 112 on the under side of the key will engage the second slide 113ª 114ª and will advance the rod 119, so that the widened end thereof will engage one of the pins 120 just as the desired type comes to the right position with relation to the platen. The type-wheel will therefore stop turning; but the continued movement of the finger-rod and the toggle-levers will continue to carry forward both slides 113 114 and 113ª 114ª; but now the type-wheel will be moved bodily toward the platen and the type will, as usual, through the medium of the ribbon, thus make its impression on the paper which lies on the platen.

By reference to Fig. 4 it will be seen that the pins 111 and 112 on each key-rod 106 can be arranged so that just the right relative movements of the two slides—that is, the shifting and locking slides—will take place. In some cases it is necessary to move the lower slide first, as the upper slide will have to move so very little to effect the proper turning of the type-wheel, and in other cases both slides will be almost simultaneously moved; but it will be readily understood that this arrangement can be easily carried out, and the plan in Fig. 4 shows the right arrangement when the letters are placed as in the key-board shown in Fig. 1.

From the foregoing description it will be readily seen that this machine can be made very small and compact, that it is very positive in its movements and operation, and that any usual printing can be well done by its use. Its operation will be clearly understood from the foregoing description.

Having thus described my invention, what I claim as new, and desire to secure by Letters Patent, is—

1. The combination with the carriage having a rack-bar and escapement for releasing the carriage and rack-bar tooth by tooth, of the slide-block movable back and forth beneath the carriage and at right angles thereto, a direct connection between the slide-block and escapement, a key-operated printing device sliding bodily backward and forward in relation to the carriage, and means for moving the slide-block independently or by the advance of the printing device.

2. In a type-writer, the combination with the carriage having a suitable release or escapement, of a slide-block operating the escapement, independent means for operating the slide-block, a type-wheel movable back and forth in relation to the carriage, and means for moving the slide-block and operating the escapement by the advance of the type-wheel.

3. In a type-writer, the combination with the carriage having a suitable release or escapement, of a slide-block operating the release, a second slide-block abutting with and adapted to move the first slide-block, a type-wheel carried on the second slide-block, and means for moving the type-wheel back and forth.

4. In a type-writer, the combination with the carriage having a suitable release or escapement, of a slide or spacer block operating the escapement, key mechanism for moving the spacer-block, a second slide-block abutting with the spacer-block, a key mechanism for moving the second slide-block, and a type-wheel carried by the second slide-block.

5. The combination with the rotatable and horizontally and vertically movable type-wheel having its type arranged in a series of rows, of a vertically-sliding arm having its upper end abutting with the type-wheel so as to permit the type-wheel to slide horizontally in relation to the arm, tilting levers in engagement with the arm, the levers having a differential throw, and a key mechanism for operating the levers.

6. In a type-writer, the combination with the rotatable and vertically and horizontally movable type-wheel, of the laterally-arranged tilting levers, one having a greater throw than the other, a sliding arm supported on the levers and engaging the type-wheel so as to permit the type-wheel to slide horizontally in relation to the arm, and a key mechanism for tilting the levers.

7. In a type-writer, the combination with the rotatable and horizontally-reciprocating type-wheel, of key-operated slides arranged to move in succession and together, and an operative connection between the slides and the type-wheel whereby the movement of one slide turns the type-wheel, the movement of the second fixes its position, and the synchronous movement of the two advances the type-wheel for printing.

8. In a type-writer, the combination with the rotatable and horizontally-reciprocating type-wheel, of slides arranged one above the other and adapted to move together or separately, the first slide being connected to the type-wheel so as to turn it, the second slide being arranged to fix the position of the type-wheel, and the movement of the two together being adapted to advance the type-wheel, and key-rods slidable parallel with the aforesaid slides and arranged to engage and move the slides.

9. In a type-writer, the combination with the rotatable and horizontally-reciprocating type-wheel and the reciprocating key-rods, of the sliding shifting rods pivotally connected to the type-wheel to turn it, means for moving the shifting rods by the movement of the key-rods, locking-rods connected to the type-wheel so as to fix its position, means for moving the locking-rods by the movement of the key-rods, and means for advancing the type-wheel by the further movement of the key-rods.

10. In a type-writer, the combination with the rotatable and horizontally-reciprocating type-wheel, of the shifting rods and locking-rods slidable in parallel relation, the shifting rods being pivoted to the type-wheel to turn it and the locking-rods having means for fixing the position of the type-wheel, and a key mechanism for moving the rods, said key mechanism being also arranged to advance the type-wheel bodily.

11. In a type-writer, the combination with the rotatable and horizontally-reciprocating type-wheel having pins or stops on the under side, of the shifting rods pivoted to the type-wheel so as to turn it, the sliding locking-rods to engage the aforesaid pins or stops to fix the position of the type-wheel, and a key mechanism for moving the shifting and locking rods.

12. In a type-writer, the combination with the rotatable and horizontally-movable type-wheel, of the slidable shifting rods pivotally connected to the type-wheel to turn it, the slidable locking-rods moving parallel with the shifting rods, stops on the type-wheel to engage the locking-rods, and freely-moving keys adapted in their movement to engage and operate the shifting and locking rods.

13. In a type-writer, the combination with the rotatable and horizontally-movable type-wheel, of the slides arranged one above the other, the shifting rods engaged and moved by the upper slides, said rods being pivotally connected to the type-wheel to turn it, the locking-rods moved by the lower slide, said rods being arranged to engage and lock the type-wheel from further rotation, the key-rods having means as the pins to cause them to engage the upper and lower slides, and means for operating the key-rods.

In testimony whereof I have signed my name to this specification in the presence of two subscribing witnesses.

JOHN D. GRIFFEN.

Witnesses:
GEO. W. CARR,
CLEMENT J. KRACHT.